United States Patent
Mashimo

(10) Patent No.: US 7,154,417 B2
(45) Date of Patent: Dec. 26, 2006

(54) OPTICAL DISK APPARATUS

(75) Inventor: Akira Mashimo, Tokorozawa (JP)

(73) Assignee: Teac Corporation, Musashino (JP)

(*) Notice: Subject to any disclaimer, the term of this patent is extended or adjusted under 35 U.S.C. 154(b) by 0 days.

(21) Appl. No.: 11/273,707

(22) Filed: Nov. 14, 2005

(65) Prior Publication Data

US 2006/0103552 A1 May 18, 2006

(30) Foreign Application Priority Data

Nov. 15, 2004 (JP) ............... 2004-330642

(51) Int. Cl.
*H03M 5/00* (2006.01)
(52) U.S. Cl. .................................... 341/58
(58) Field of Classification Search ........... 341/58, 341/59, 68, 95, 106
See application file for complete search history.

(56) References Cited

U.S. PATENT DOCUMENTS

| | | | |
|---|---|---|---|
| 6,014,094 A * | 1/2000 | Hayashiyama et al. | 341/58 |
| 6,687,206 B1 | 2/2004 | Masui | |
| 6,982,660 B1 * | 1/2006 | Nakagawa et al. | 341/58 |
| 2003/0053389 A1 | 3/2003 | Mashimo | |

FOREIGN PATENT DOCUMENTS

| | | |
|---|---|---|
| JP | 2000-339694 | 12/2000 |
| JP | 2001-184656 | 7/2001 |
| JP | 2001-266348 | 9/2001 |
| JP | 2003-91819 | 3/2003 |

* cited by examiner

*Primary Examiner*—Brian Young
(74) *Attorney, Agent, or Firm*—Christensen O'Connor Johnson Kindness PLLC

(57) ABSTRACT

In an optical disk apparatus, the polarity of synchronization information is adaptively set to thereby improve the quality of data recording and reproduction. When inserting and recording synchronization information, an encoder of an optical disk apparatus temporarily sets the polarity of the synchronization information to either a mark or a space in accordance with a predetermined rule. A DSV which is obtained if the synchronization information is to be recorded with the polarity which has been temporarily set is computed. If the DSV which is computed is equal to or smaller than a predetermined limit value, the polarity which has been temporarily set is accepted and the synchronization information is actually recorded with the polarity. If the DSV which is computed exceeds the limit value, on the other hand, the polarity which has been temporarily set is not adopted, and the synchronization information is actually recorded with a polarity which is different from the polarity.

15 Claims, 9 Drawing Sheets

OPTICAL DISK APPARATUS

BACKGROUND OF THE INVENTION

1. Field of the Invention

The present invention relates to an optical disk apparatus, and more specifically to a structure of synchronization information.

2. Description of Related Art

Optical disk apparatuses have hitherto optimized recording power by means of a technique called OPC (Optimum Power Control) and ROPC (Running Optimum Power Control), thereby recording data. According to the OPC technique, prior to data recording, test data is recorded in a predetermined area (PCA) of an optical disk while the recording power is varied in various ways, and the test data is reproduced. Recording power at which the quality (e.g., a β value) of the reproduced signal is optimized is selected as optimum recording power. In the meantime, according to the ROPC technique, consideration is given to the fact that the sensitivity of a recording film is not necessarily uniform within the plane of an optical disk. Then, when data is actually recorded at the optimum recording power determined through OPC, the quantity of return light at the time of data recording is monitored, and the recording power is controlled by feedback such that the quantity of return light assumes a fixed value. In general, the quantity of light of level B is used as the quantity of return light. Here, the level B represents the quantity of return light acquired as a result of formation of a pit when light of recording power is irradiated (i.e., the quantity of return light arising as a result of the recording power having been diffracted by the pit). Specifically, (in a case of an optical disk whose reflectivity is lowered due to data recording) when the quantity of return light of level B is below a given value, it is determined that pits are formed to an excessive degree, thus reducing the recording power. On the contrary, when the quantity of return light of level B exceeds the given value, it is determined that pits are not formed to a sufficient degree, thus increasing the recording power.

Here, data having lengths of 3 T to 11 T (T is a reference clock length) is recorded on a CD-R/RW or the like, and it is difficult to monitor the quantity of return light resulting from light being diffracted by pits having short data lengths and control the recording power through feedback. In view of this difficulty, the quantity of return light at the time of recording of data having the longest pit length of 11 T is detected, to thus effect ROPC. The CD-R/RW complies with specifications in which data of a length of 11 T is included in synchronization information (SYNC) and two data sets, each having a length of 11 T, always appear twice successively in each frame. Accordingly, as one of the two data sets, each having a length of 11 T, always corresponds to a mark (i.e., a data portion forming a pit by irradiation of recording power), ROPC is carried out periodically (i.e., at the timing of periodically-inserted synchronization information) through use of the data having the length of 11 T, thereby allowing periodical optimization of the recording power.

In the case of a DVD-R/RW or the like, however, while data is formed to lengths of 3 T to 11 T as in the case of the CD-R or the like, the DVD-R/RW complies with specifications in which, contrary to those of the CD-R or the like, a data length of 14 T is used for synchronization information and such synchronization information having a 14 T pit length is inserted only once in one frame (93 bytes), not twice successively (i.e. as a pair of a mark and a space).

Further, selection of the synchronization information having a data length 14 T as a mark or a space is arbitrary. For example, when all of data having a pit length of 14 T is set to spaces, pits are not formed to the longest pit length of 14 T, and hence ROPC cannot be performed. Consequently, the recording power cannot be periodically optimized, which in turn poses difficulty in maintaining recording quality. It is of course possible to consider that ROPC is enabled by forming all of the data having a 14 T pit length with marks. When all of the data having a 14 T pit length is formed with marks, however, a DSV (Digital Sum Value) may increase, which results in an increase in low-frequency components. Here, the DSV (Digital Sum Value) is a value determined by accumulating all bits in a sequence, which takes two statuses, from the top, while one status (e.g., 1) of the bit sequence is taken as +1 and the other status (e.g., 0) of the same is taken as −1. The smaller the DSV, the smaller the low-frequency components (DC components), resulting in an improvement in recording and reproducing quality.

Moreover, an HD-DVD may suffer from the same problems as described above with regard to DVD-R/RW. Specifically, in HD-DVD, while data is formed to lengths of 2 T to 11 T and a data length of 13 T is used for synchronization information, such synchronization information having a 13 T data length is inserted only once in one synchronous frame.

In view of these circumstances, Japanese Patent Laid-Open Publication No. 2003-91819 describes a technique for setting marks and spaces as synchronization information items such that they are arranged alternately. According to this technique, ROPC, or the like, is periodically performed with respect to the synchronization information items which are marks, thereby allowing optimization of the recording power.

The above technique, however, poses a problem that the DSV is not necessarily suppressed even when the synchronization information is formed such that a mark and a space are arranged alternately. Specifically, the DSV is determined by the synchronization information and subsequent modulated data, and therefore the DSV is minimized in consideration of both the polarity (i.e. mark or space) of the synchronization information and the polarity of the modulated data. In this case, however, if the synchronization information is uniformly set such that a mark and a space are arranged alternately, there arises a necessity for adjusting the DSV only by means of the modulated data, leading to a possibility that the DSV may not be suppressed.

Further, if the synchronization information is uniformly fixed such that a mark and a space are arranged alternately, there arises a portion on a rewritable optical disk, for example, which always corresponds to a mark at the time of recording data, causing deterioration of characteristics of a recording film to further decrease the number of times data on the optical disk can be rewritten.

On the other hand, in a case of forming the synchronization information on an optical disk having a land pre-pit (LPP) formed thereon, such as DVD-R and DVD-RW, if the synchronization information having a data length of 14 T is formed in synchronization with the synchronization LPP, there arises a problem that accuracy of detecting the LPP signal varies depending on the polarity of the synchronization information. In particular, when the synchronization information is formed with a polarity of a mark, the amplitude of the LPP signal decreases to thereby deteriorate the detection accuracy. More specifically, the LPP is formed in synchronization with a wobble signal, and the LPP signal is superimposed on the peaks of the wobble signal. Here, it is possible to extract the LPP signal by means of appropriate setting of a binary threshold value and window setting as long as the LPP signal has a sufficient level. However, when a laser power which is modulated is irradiated onto an optical disk so as to record the synchronization information with a mark having a data length of 14 T at the position of the LPP, heat is dissipated over to an adjacent land in the process of forming the mark of 14 T with the irradiated laser power, which may cause deformation of the LPP in the adjacent land to thereby deteriorate the LPP signal level. Further, in the case of data reproduction after the synchronization information is recorded with a mark having a data length of 14, the following problem occurs. Specifically, while the LPP signal is superimposed on the wobble signal, the LPP signal may be deformed under the influence of recording of the 14 T mark, thereby lowering the signal level. In addition, as the mark portion having a length of 14 T forms a pit, the reflectivity of this portion itself also decreases, which makes it still difficult to extract the LPP signal from the reproduced signal. A similar problem may arise in a case where data is reproduced after data recording. In other words, the synchronization information of 14 T and the LPP are present at a synchronized position, which means that the LPP signal is included in the 14 T portion in a reproduced signal, as a result of which an error may be caused in detecting the 14 T synchronization information.

It is therefore desired to set the polarity of synchronization information such that accuracy of detecting an LPP signal is increased and ROPC can be secured with a mark appearing at a desired frequency, and the DSV can also be suppressed.

SUMMARY OF THE INVENTION

In accordance with an aspect of the present invention, there is provided an optical disk apparatus which records data on an optical disk by inserting synchronization information in every predetermined information unit, comprising temporarily setting means for temporarily setting a polarity of a next synchronization information item to either a mark or a space in accordance with a predetermined rule; computation means for computing a DSV to be obtained by inserting the next synchronization item with the polarity which has been temporarily set; determination means for determining whether or not the DSV which is computed is equal to or smaller than a predetermined limit value; and synchronization information controlling means which accepts the polarity which has been temporarily set and inserts the next synchronization information item with the polarity when, as a result of the determination by the determination means, it is determined that the DSV is equal to or smaller than the predetermined limit value and which does not accept the polarity which has been temporarily set and inserts the next synchronization information with a polarity with which the DSV is minimized when, as a result of the determination by the determination means, it is determined that the DSV exceeds the predetermined limit value.

In another aspect, the present invention provides an optical disk apparatus which records data on an optical disk by inserting synchronization information in every predetermined information unit, comprising temporarily setting means for temporarily setting a polarity of a next synchronization information item to either a mark or a space in accordance with a predetermined rule; computation means for computing a DSV to be obtained by inserting the next synchronization item with the polarity which has been temporarily set; determination means for determining whether or not the DSV which is computed is equal to or smaller than a predetermined limit value; and synchronization information controlling means which accepts the polarity which has been temporarily set and inserts the next synchronization information item with the polarity when, as a result of the determination by the determination means, it is determined that the DSV is equal to or smaller than the predetermined limit value and which does not accept the polarity which has been temporarily set and inserts the next synchronization information with a polarity which is different from the polarity which has been temporarily set when, as a result of the determination by the determination means, it is determined that the DSV exceeds the predetermined limit value.

The present invention is applicable to any technique for setting a polarity of synchronization information to either a mark or a space using a predetermined rule. When the polarity of synchronization information is set to, for example, a mark using the predetermined rule, according to the present invention, the polarity, i.e. a mark, is placed in a temporarily set state, rather than immediately adopting the polarity. Then, a DSV to be obtained if the synchronization information of a mark is inserted and recorded (i.e. a DSV obtained concerning from the immediately preceding synchronization information through the current synchronization information) is computed, and it is confirmed whether or not the computed DSV is equal to or smaller than a limit value. If the DSV which is computed is equal to or smaller than the limit value, it is assured that the DSV can be suppressed when the synchronization information which is the polarity as set by the predetermined rule is inserted, thereby adopting the polarity which has been temporarily set. If the DSV exceeds the limit value, on the other hand, a polarity is determined while top priority is given to the minimized DSV rather than adopting the polarity which has been set according to the predetermined rule. In the present invention, as the polarity setting in accordance with the predetermined rule is only assured under the condition that the DSV is equal to or smaller than a limit value, a desired advantage that ROPC is carried out at predetermined periods or that deterioration of the LPP signal is suppressed can be achieved. Also, DC components can be suppressed because when the DSV exceeds the limit value, the polarity is determined while a higher priority is given to the minimized DSV.

According to the present invention, the synchronization information is inserted with a polarity which has been set according to a predetermined rule if the resulting DSV is equal to or smaller than a limit value, whereas the polarity is determined while priority is given to the minimized DSV if the resulting DSV exceeds the limit value. Consequently, the polarities of the synchronization information can be set in a desired sequence in accordance with a rule, while the DSV is suppressed reliably.

BRIEF DESCRIPTION OF THE DRAWINGS

Preferred embodiments of the present invention will be described in detail based on the following figures, wherein.

DETAILED DESCRIPTION OF PREFERRED EMBODIMENT

Preferred embodiments of the present invention will be described in detail with reference to the accompanying drawings.

Figure 1:
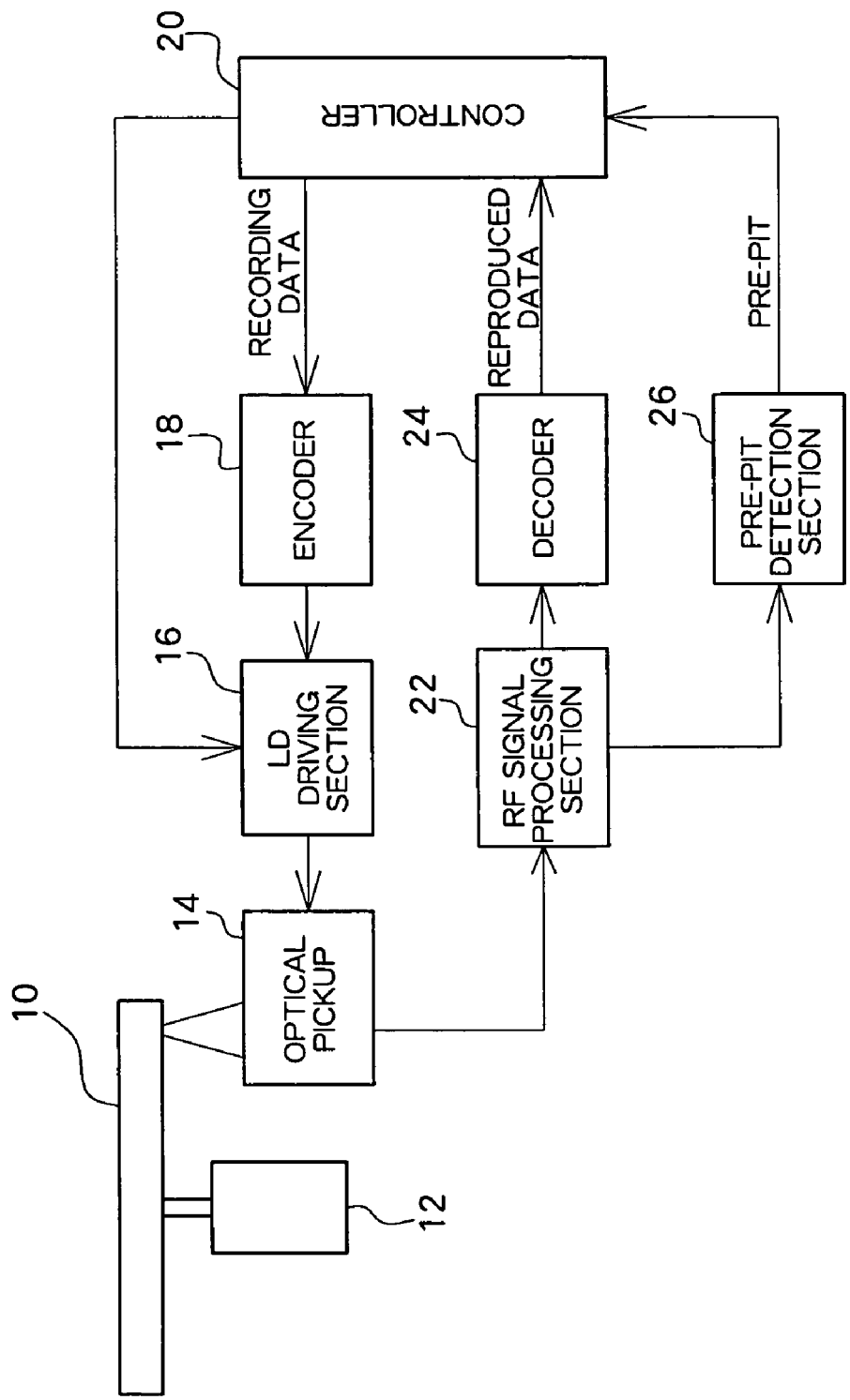
FIG. 1 is an overall block diagram of an optical disk apparatus according to an embodiment of the present invention.

FIG. 1 is a block diagram showing a structure of an optical disk apparatus according to an embodiment. An optical disk 10 is driven by a spindle motor 12 to rotate at a CAV (or CLV). When the optical disk 10 is a DVD-R or DVD-RW, in which pre-pits (land pre-pits: LPP) are formed at predetermined intervals in a region (land) between grooves which are information recording tracks, a position within a plane of the optical disk 10 can be specified by detecting the pre-pits.

An optical pickup 14, which is disposed so as to oppose the optical disk 10, emits laser light of a recording power onto the optical disk 10 for recording data and emits laser light of a reproducing power onto the optical disk 10 for reproducing recorded data. At the time of recording, recording data supplied from a controller 20 is modulated by an encoder 18 and is further converted into a drive signal by an LD driving section 16 for driving a laser diode (LD) of the optical pickup. At the time of reproduction, on the other hand, a quantity of return light having been converted into an electrical signal by the optical pickup 14 is supplied to an RF signal processing section 22, is then further demodulated by a decoder 24 and supplied, as reproduced data, to the controller 20.

The RF signal processing section 22 includes an amplifier and an equalizer, a binarization section, a PLL section, or the like, and binarizes (digitizes in binary data) an RF signal which has been boosted to generate a synchronization clock, which is then output to the decoder 24. The reproduced RF signal is also supplied to a pre-pit detection section 26.

The pre-pit detection section 26 detects a signal component of a pre-pit LPP formed in a land adjacent to a groove (i.e. a land adjacent to a groove on the outer peripheral side), which is contained in the reproduced RF signal, and supplies the result to the controller 20.

The controller 20, which is formed by a microcomputer or the like, supplies the recording data, as well as pre-pit information which is detected, to the encoder 18. The encoder 18 modulates the recording data and periodically inserts synchronization information based on the pre-pit detection information. The encoder 18 then supplies a data signal to the LD driving section 16. The encoder 18 will be described in further detail below.

While the optical disk apparatus of the embodiment further includes a servo system which generates a focus error signal and a tracking error signal for controlling focus and tracking by means of a focus servo and a tracking servo, such a servo system will not be described here because it is the same as that in conventional systems. Also, with regard to a strategy used when recording data, a recording strategy which is similar to the conventional strategy may be used. Specifically, a recording pulse is superimposed on the reproducing level to achieve laser light of the recording power, and also recording is performed using a plurality of recording pulses (i.e. a multipulse), not a single pulse, for forming one pit. More specifically, data having a length of 3 T is recorded using a single pulse, and data having a length of 4 T or longer (including a length of 14 T) is recorded using a multipulse.

Further, in the optical disk apparatus according to the present embodiment, techniques called OPC (Optimum Power Control) and ROPC (Running Optimum Power Control) are performed so as to optimize the recording power. Specifically, prior to data recording, the controller 20 supplies test data to the encoder 18 for recording the test data on a PCA area of the optical disk 10 while the recording power is being varied in a plurality of steps. The recorded test data is then reproduced using laser light of a reproducing power, and the optimum recording power is selected based on a β value or the like of the reproduced RF signal obtained at this time. The data recording is then performed at the selected recording power. In addition, the controller 20 periodically detects a quantity of return light obtained at the time of data recording, and determines whether or not the level B of the detected return light (i.e. the reflection level after formation of a pit) matches a predetermined value stored in a memory. If the compared values do not match, the controller 20 controls the LD driving section 16 to increase or decrease the recording power in accordance with the comparison result. In the present embodiment, ROPC is performed at the time of forming a data portion having a pit length of 14 T (i.e. a mark) included in the synchronization information.

When the optical disk 10 is DVD-R or DVD-RW, pre-pits are formed at predetermined intervals in a land which is provided between grooves, as described above. Data to be recorded in the groove is previously divided into SYNC frames which are information units. A total number of twenty-six SYNC frames, i.e., the 0th frame to the 25th frame, constitute one sector, and then sixteen sectors constitute one ECC block. The synchronization information (SYNC or SY) for achieving synchronization for each frame is inserted at the head of each SYNC frame. The synchronization information SYNC adopts a data length of 14 T which is sufficiently longer than the data length of 11 T which is the longest data length appearing in the data modulation portion, such that synchronization of SYNC frames can be reliably achieved. Under the specifications of DVD-R, either a mark or a space may be selected for the 14 T synchronization information, and the encoder 18 of the present embodiment selects the polarity of the 14 T synchronization information according to a predetermined rule and inserts the selected polarity of the synchronization information into a data string. The grooves are wobbled at a predetermined frequency, such that the number of rotations of the optical disk 10 can be detected by detection of the wobble frequency. The SYNC frames include even frames (EVEN frames) and odd frames (ODD frames), and the pre-pits are generally formed corresponding to the EVEN frames. In this case, however, if pre-pits are located at substantially the same position in lands adjacent, on both sides, to a groove in which recording is to be performed, components of the two pre-pits will be mixed in the return light, and therefore the pre-pits are shifted to the odd frames so as to eliminate such interference. Further, the wobble frequency is set to eight times the SYNC frame frequency, and the pre-pits are disposed so as to be located at the first three peaks of the wobble within one SYNC frame, the first pre-pit thereof being the SYNC pre-pit representing the synchronous position. The optical disk apparatus can detect or predict the synchronous position by detecting the SYNC pre-pit from a reproduced signal, and allocates the 14 T synchronization data (SYNC data) to this synchronous position to thereby record data.

Eight different types of synchronization information items are defined so as to identify the SYNC frames, and two types of synchronization information items, i.e. primary synchronization information and secondary synchronization information, are defined for each of the eight types of synchronization information items. The primary synchronization information and secondary synchronization information are of opposite polarities. When the primary synchronization information is a mark, the secondary synchronization information is a space, whereas when the primary synchronization information is a space, the secondary synchronization information is a mark. Whether the primary synchronization information becomes a mark or a space depends on the preceding data series. In order to suppress the DSV, a DSV obtained if the primary synchronization information is to be used and a DSV obtained if the secondary synchronization information is to be used are compared, and the primary synchronization information or the secondary synchronization information that has the smaller DSV is selected. The DSV may be suppressed by a method in which, when 8-bit data before modulation falls in the range of 0 to 87, a sub conversion table is used in place of a main conversion table or by a method in which, when 8-bit data before modulation falls in the range of 88 to 225, a state of the synchronization information is changed.

The structure of and processing performed by the encoder 18 for setting the polarity of the synchronization information will be described.

Figure 2:
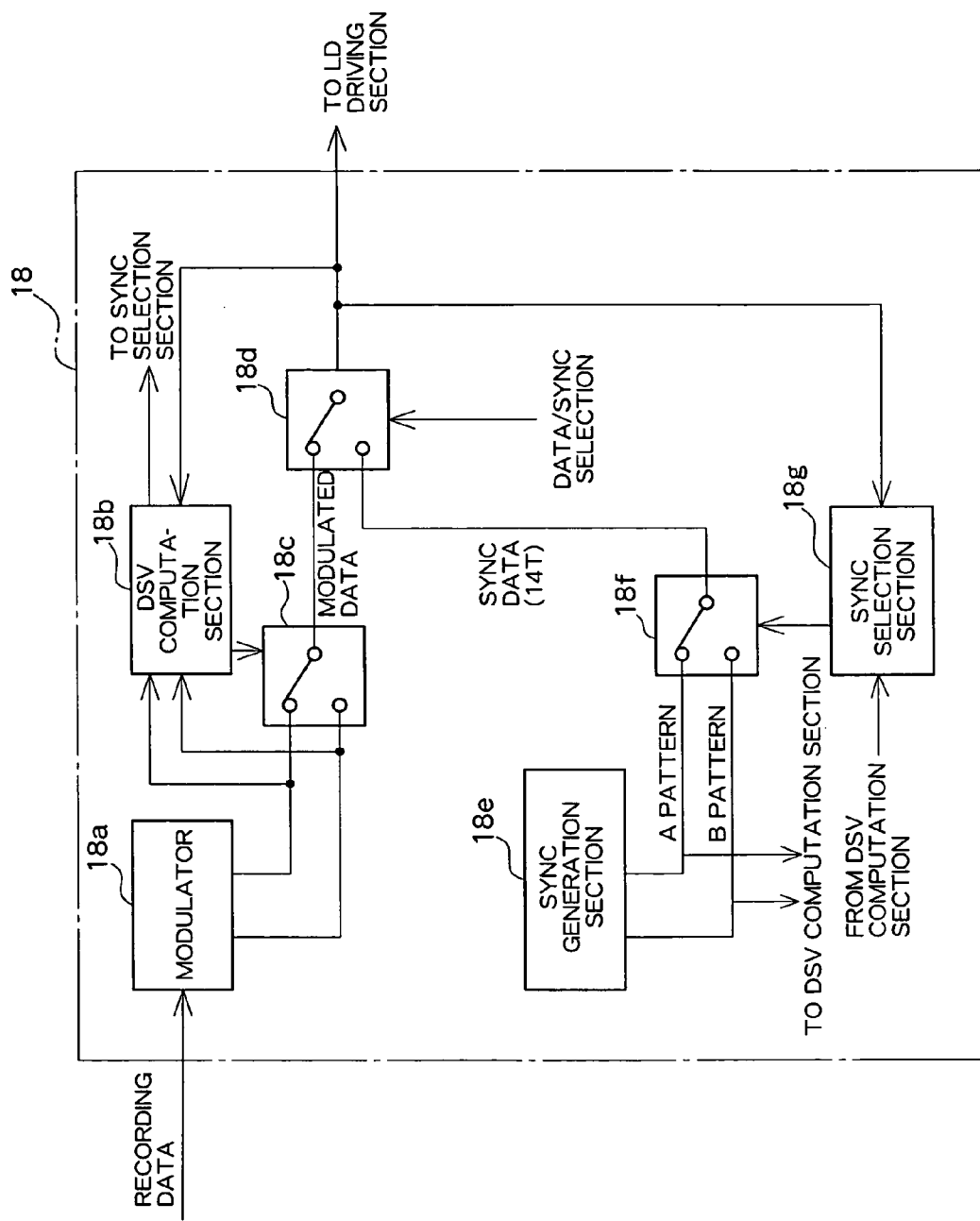
FIG. 2 is a diagram showing a structure of an encoder shown in FIG. 1.

FIG. 2 is a block diagram showing a detailed function of the encoder 18 shown in FIG. 1. The encoder 18 includes a modulator 18a, a DSV computation section 18b, a SYNC generation section 18e, a SYNC selection section 18g, and a selection switches 18c, 18d, and 18f.

The modulator 18a subjects the recording data supplied from the controller 20 to eight-to-sixteen (8/16) conversion to generate a signal having a data length of 3 T to 11 T, and supplies the signal to the selection switch 18c. The modulator 18a generates two types of data (i.e. data obtained by conversion based on a main conversion table and data obtained by conversion based on a sub conversion table) and supplies the data to the selection switch 18c. Here, the two types of modulated data are generated so as to allow selection of modulated data with which the DSV is minimized at the DSV computation section 18b, as described above.

The DSV computation section 18b computes a DSV of a modulated data series to be supplied to the LD driving section 16, i.e. data to be recorded on the optical disk 10, and supplies a selection signal to the selection switch 18c based on the computation result, for selecting the modulated data. The DSV is a value determined by accumulating all bits in a sequence, which takes two statuses, from the top, while one status (e.g., 1) of the bit sequence is taken as +1 and the other status (e.g., 0) of the same is taken as −1. The smaller the absolute value of the DSV, the smaller the low-frequency components (DC components), resulting in suppression of the low-frequency components for improving recording and reproducing quality. The modulated data which is selected by the selection switch 18c based on the DSV value is then supplied to the selection switch 18d.

The selection switch 18d is a switch for switching between the modulated data and the synchronization information, and performs switching operation based on the pre-pit detection data (data/SYNC selection data) output from the controller 20, and a clock signal. Specifically, when the pre-pit detection data is supplied from the controller 20 (in a case of an even frame, for example) and a predetermined clock is counted therefrom (in a case of an odd frame, for example), it is determined that it is a time when the synchronization information is to be inserted and the selection switch 18d is switched to the SYNC data side for outputting the synchronization data. At any time other than that time, the selection switch 18d is switched to the modulated data side for outputting the modulated data, which is then supplied to the LD driving section 16. Consequently, the synchronization information can be inserted into the synchronous positions. The modulated data/SYNC data output from the selection switch 18d is supplied to the LD driving section 16 after having been converted into an NRZI scheme.

The SYNC generation section 18e generates the synchronization information having a data length of 14 T. Specifically, the SYNC generation section 18e generates two synchronization information patterns, i.e. a pattern in which the 14 T portion comes to a mark (A pattern) and a pattern in which the 14 T portion comes to a space (B pattern), which are determined depending on a data portion connecting to the previous SYNC frame, i.e. the immediately preceding modulated data, and supplies these two patterns to the selection switch 18f.

The selection switch 18f selects one of the polarities, i.e. the A pattern (mark) and the B pattern (space), under control of the SYNC selection section 18g. The SYNC selection section 18g determines the polarity of the synchronization information to be inserted based on the DSV, the polarity of the previous synchronization information, or the polarity of the synchronization information immediately before the previous synchronization information. The selection processing in the SYNC selection section 18g will be described below.

Figure 3:
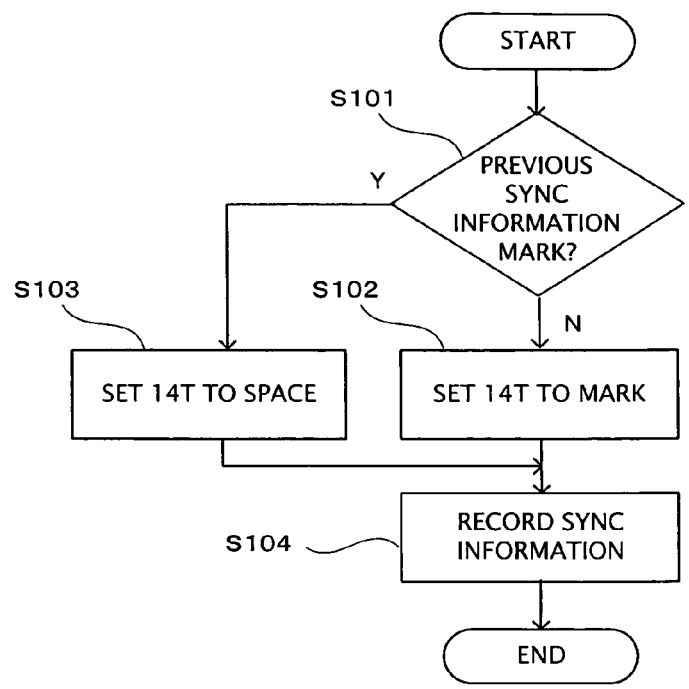
FIG. 3 is a flowchart for setting a polarity of synchronization information which is used as a base processing of the embodiment.

FIG. 3 shows a process flowchart which is used as a base processing for selecting the polarity in the SYNC selection section 18g. The polarity selection algorithm is set such that marks and spaces appear alternately in a manner of a mark, a space, a mark, a space, and so on. It is first determined whether or not the polarity of the previous synchronization information is a mark (S101). If the polarity of the previous synchronization information is a space, the polarity of the current synchronization information is set to a mark (S102), whereas if the polarity of the previous synchronization information is a mark, the polarity of the current synchronization information is set to a space (S103). After selection of the polarity, the synchronization information having a data length of 14 T is recorded with the selected polarity (S104). By alternating the polarities in this manner, it is assured that a mark appears every one of two times without fail, whereby ROPC can be performed at a data portion of the mark. In this case, however, suppression of the DSV is not necessarily assured.

Figure 4:
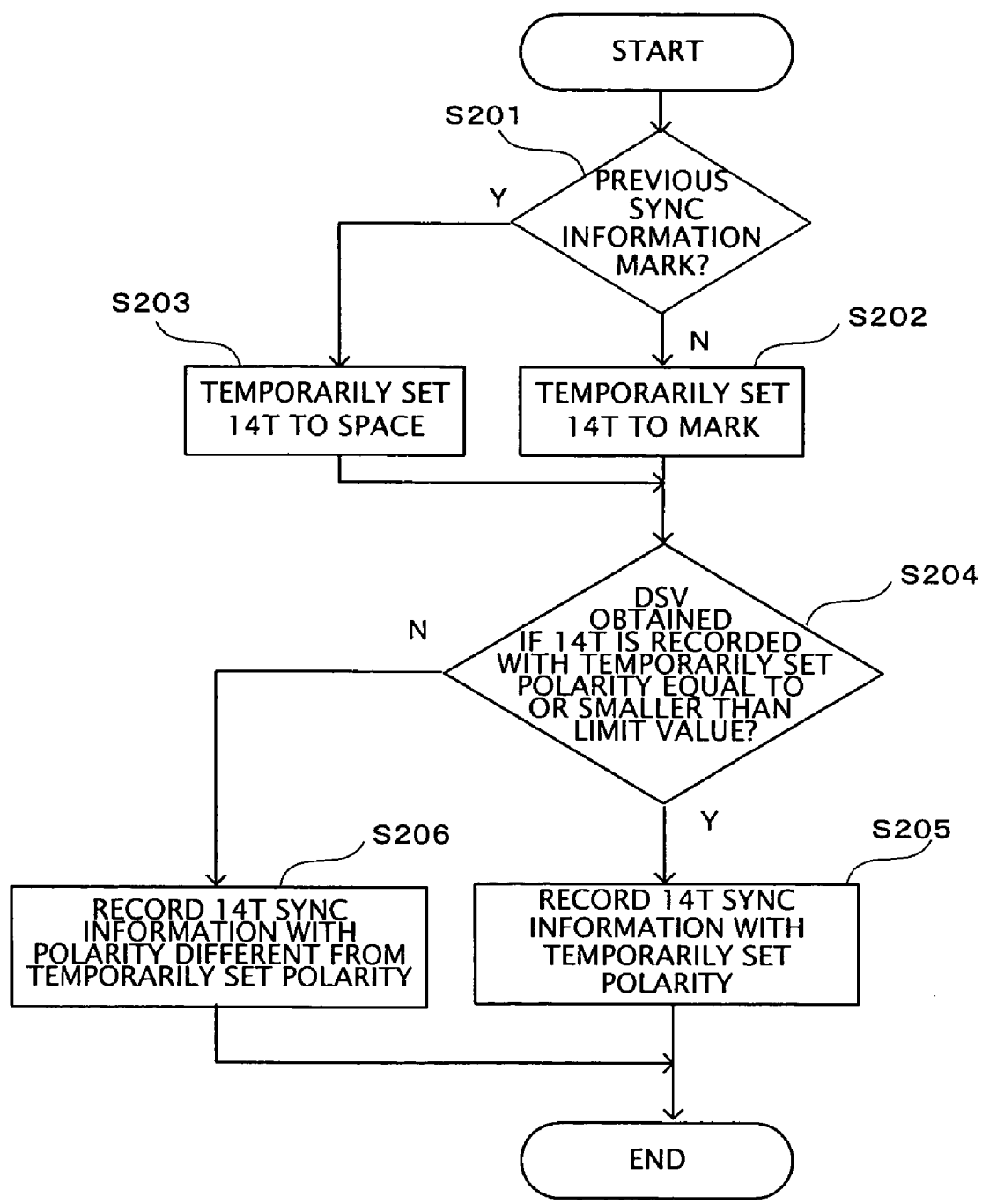
FIG. 4 is a process flowchart of the embodiment corresponding to FIG. 3.

FIG. 4 shows a process flowchart according to the present embodiment using the process flowchart of FIG. 3 as a base processing. As in the step S101 described above, it is first determined whether or not the polarity of the previous synchronization information is a mark (S201). If the polarity of the previous synchronization information is a space, the polarity of the current synchronization information is temporarily set to a mark (S202), whereas if the polarity of the previous synchronization information is a mark, the polarity of the current synchronization information is temporarily set to a space (S203). Then, the DSV obtained if the synchronization information is recorded with the polarity which has been temporarily set is computed, and it is determined whether or not the computed DSV is equal to or smaller than a predetermined limit value (S204). This determination processing is performed so as to assure that the DSV is suppressed when the synchronization information is recorded with the polarity which has been temporarily set. The limit value of the DSV can be set to ±1023, for example. Of course, a limit value which is more strict than ±1023 can be set. If the DSV obtained if the synchronization information is recorded with the polarity which has been temporarily set is equal to or smaller than the limit value, which means that suppression of the DSV is assured, the polarity which has been temporarily set at step S202 or S203 is adopted, and the synchronization information is recorded using the polarity (S205). On the other hand, if the DSV exceeds the limit value when the synchronization information is recorded with the polarity which has been temporarily set, which means that the basic algorithm shown in FIG. 3 cannot be followed, then the synchronization information is recorded with a polarity which is different from the polarity which has been temporarily set (S206). Thereafter, the processes at step S201 and the subsequent steps will be repeated.

Consequently, while with the process of the present embodiment, the polarities of the synchronization information are basically assumed to alternate in a manner of a mark, a space, a mark, a space, and so on, the synchronization information will be recorded with polarities of a mark, a space, a mark, a mark, if it is determined that the DSV exceeds the limit value when the polarity of the fourth synchronization information is set to a space.

According to the above example, because the basic algorithm in which polarities of the synchronization information are arranged alternately is adopted, it is possible to perform ROPC with a mark appearing basically once in two times and also to reliably suppress the DSV.

Figure 5:
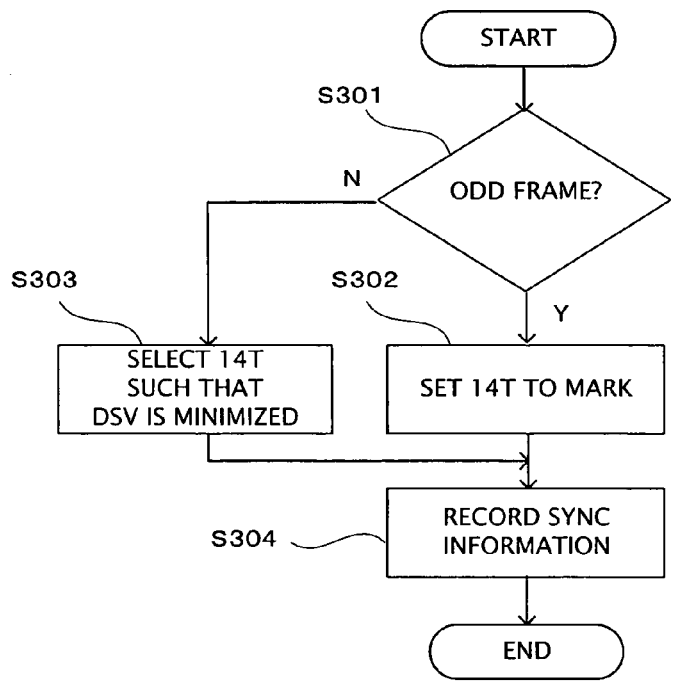
FIG. 5 is another flowchart for setting a polarity of synchronization information which is used as a base processing of the embodiment.

FIG. 5 shows a flowchart of another base processing. Specifically, in this base processing, the polarity of the synchronization information is set to a mark in odd frames, whereas the polarity of the synchronization information is set such that the DSV is minimized in even frames. It is first determined whether or not the frame to which the synchronization information is to be recorded is an odd frame (S301). If the frame is an odd frame, the polarity of the synchronization information is always set to a mark (S302). If the frame is an even frame, on the other hand, the polarity of the synchronization information is set such that the DSV is minimized (S303). Then, the synchronization information is recorded with the polarity which is thus set (S304). In this algorithm in which the polarity is always a mark in odd frames, a mark appears at least once in two times, whereby ROPC can be performed at this timing of marks. Further, the polarity with which the DSV is the smaller is selected for even frames, the DSV can be suppressed to a certain degree. In addition, in even frames in which the LPP is generally formed, appearance of spaces can be expected at a fixed frequency, so that deterioration of the LPP signal caused by marks can be suppressed.

Figure 6:
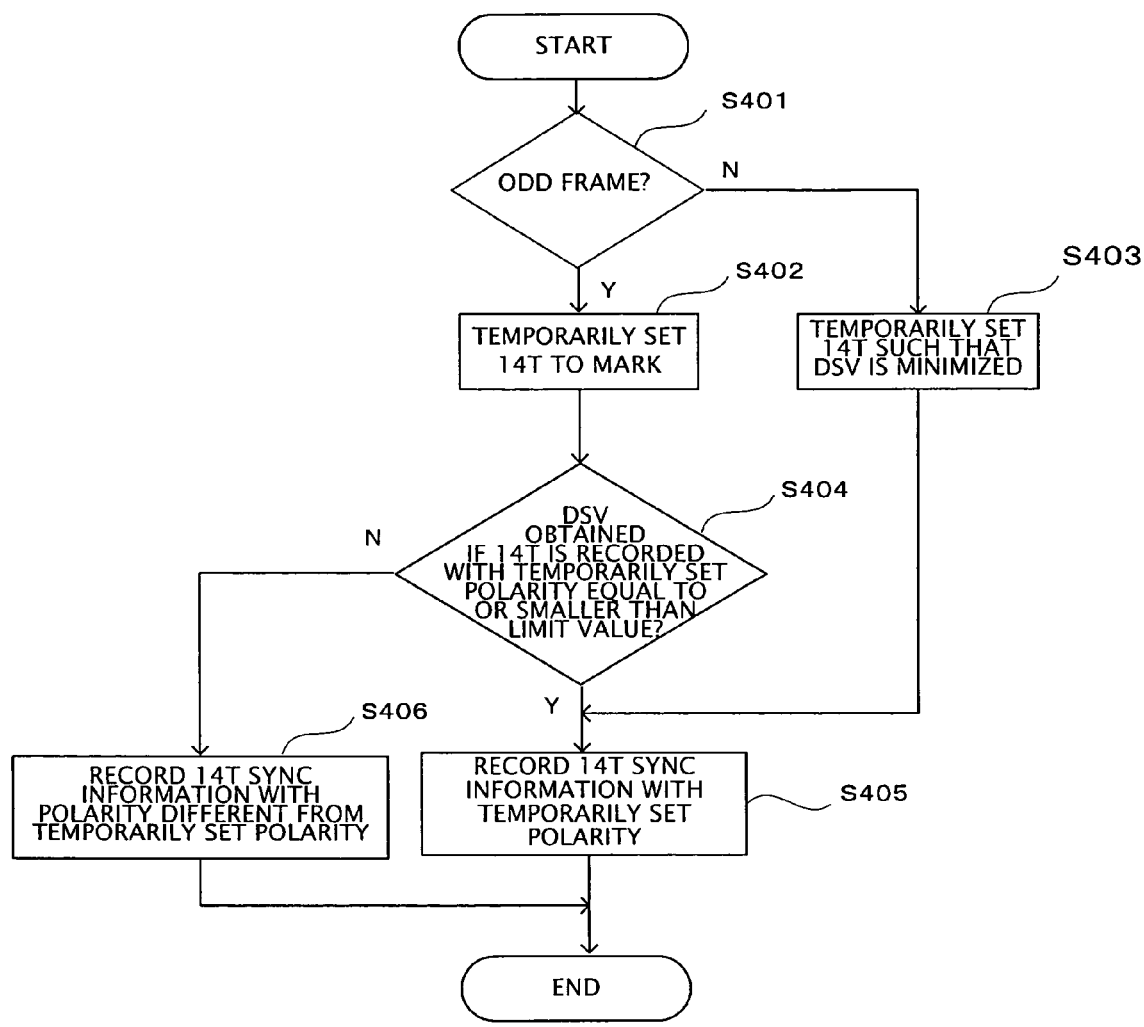
FIG. 6 is a process flowchart of the embodiment corresponding to FIG. 5.

FIG. 6 shows a process flowchart of the present embodiment using the base processing of FIG. 5. It is first determined, as in step S301, whether or not the frame to which the synchronization information is to be recorded is an odd frame (S401). If the frame is an odd frame, the polarity of the synchronization information having a data length of 14 T is temporarily set to a mark (S402). If the frame is an even frame, on the other hand, the polarity of the synchronization information is temporarily set such that the DSV is minimized (S403). Then, if the polarity is temporarily set to a mark, it is determined whether or not the DSV obtained if the synchronization information is recorded with the polarity which has been temporarily set is equal to or smaller than a predetermined limit value (S404). Here, while the limit value can be set to ±1023, for example, other values may be used. Then, if the DSV is determined to be equal to or smaller than the limit value at step S404, which means that suppression of the DSV can be assured even with a mark being set in an odd frame, the synchronization information is recorded with the polarity which has been temporarily set (S405). On the other hand, if the DSV exceeds the limit value at step S404, which means that it is not appropriate to set the polarity to a mark in the odd frame, the synchronization information is recorded with a polarity which is different from the polarity which has been temporarily set, i.e. with a space (S406). If the frame to which the synchronization information is to be recorded is determined to be an even frame at step S401, as the polarity is temporarily set such that the DSV is minimized at step S403, the synchronization information can be recorded with the polarity which has been temporarily set, without undergoing the determination process at step S404.

According to the above example, while the polarities of the synchronization information are originally assumed to be in a manner of a mark, a polarity as determined by DSV, a mark, a polarity as determined by DSV, and so on, the synchronization information will be recorded with the polarities of a mark, a polarity as determined by DSV, a space, a polarity as determined by DSV, if it is determined that the DSV exceeds the limit value when the polarity of the third synchronization information is set to a mark. Consequently, it is possible to assure ROPC at the timing of the polarity of marks and also to assure suppression of DSV more reliably. Further, because an occasion where a space, not a mark, is set in an odd frame may arise, influence of the marks on the LPP signal can be suppressed.

Figure 7:
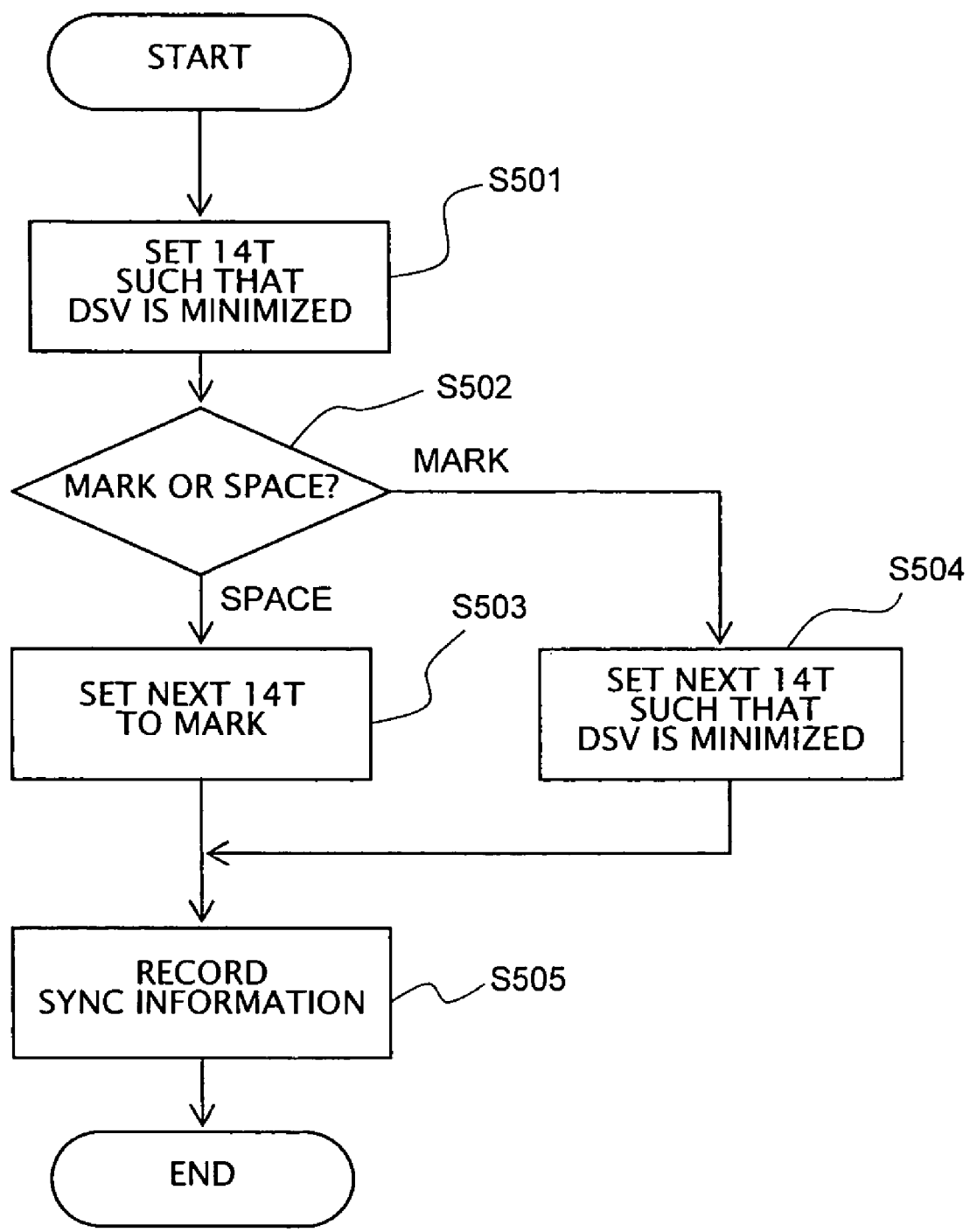
FIG. 7 is still another flowchart for setting a polarity of synchronization information which is used as a base processing of the embodiment.

FIG. 7 shows a flowchart of still another base processing. Specifically, in this base processing, the polarity of the synchronization information is set such that the DSV is minimized, and the polarity of the next synchronization information is determined in accordance with the polarity which has been thus set. First, the polarity of the synchronization information is set such that the DSV is minimized, and the synchronization information is recorded with the polarity which is set (S501). It is then determined to which of a mark or a space the polarity of the synchronization information has been set (S502). If the polarity which has been set is a space, then the polarity of the next synchronization information is set to a mark (S503). If the polarity which has been set is a mark, the polarity of the next synchronization information is set further based on the DSV (S504). Then, the next synchronization information is recorded with the polarity which has been thus set (S505). With the above processing, when a space is selected as the polarity of certain synchronization information for suppressing the DSV, the polarity of the next synchronization information is always set to a mark, whereby ROPC can be performed using this mark portion. Further, as the polarity is set based on the DSV at least once in two times without fail, the DSV can be suppressed.

Figure 8:
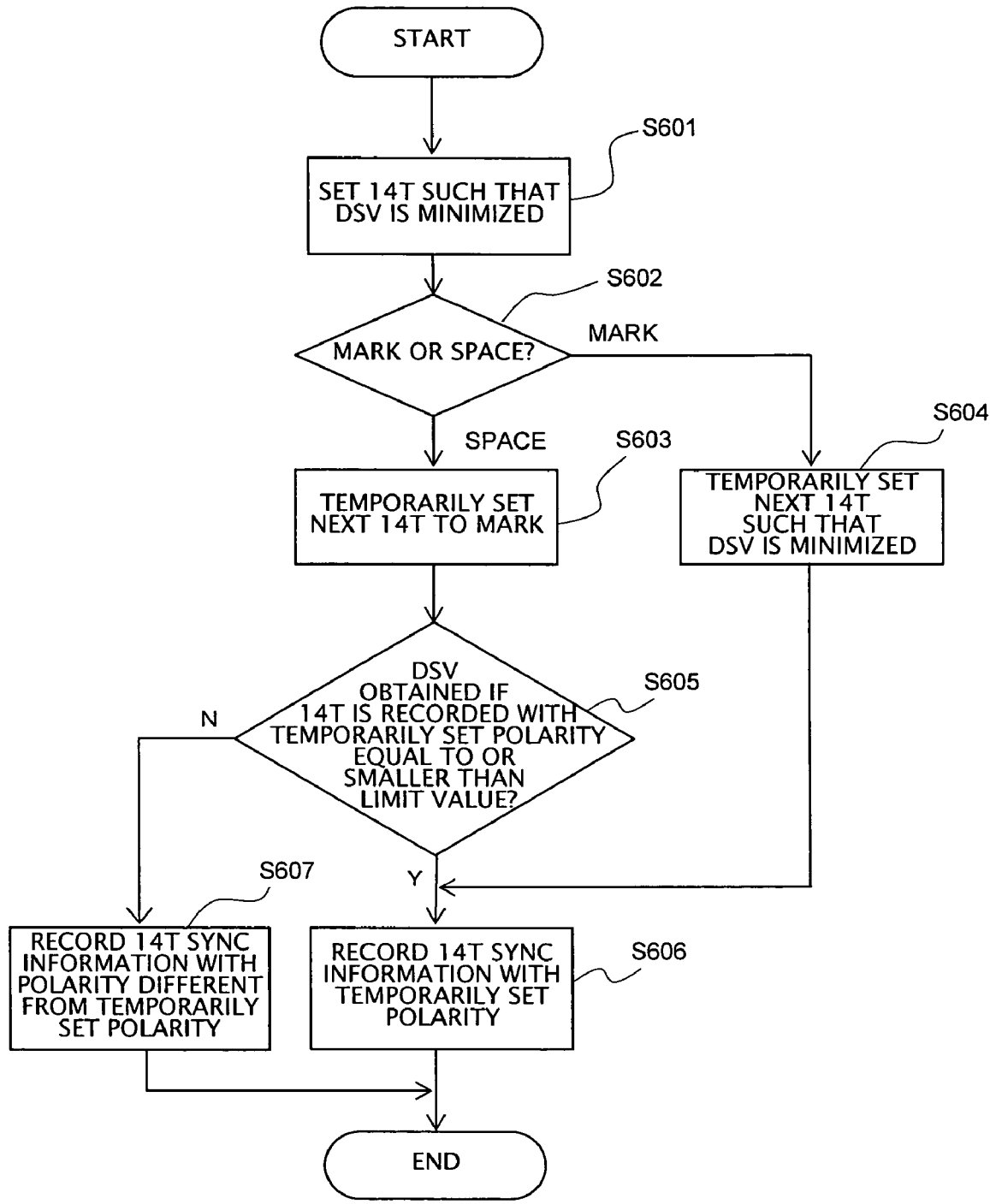
FIG. 8 is a process flowchart of the embodiment corresponding to FIG. 7.

FIG. 8 shows a process flowchart of the present embodiment using the base processing of FIG. 7. First, as in step S501, the polarity of the first synchronization information is set such that the DSV is minimized, and the synchronization information is recorded with the polarity which has been set (S601). It is then determined to which of a mark or a space the polarity of the first synchronization information has been set (S602). If the polarity which has been set is a space, the polarity of the next synchronization information is temporarily set to a mark (S603). If the polarity which has been set is a mark, on the other hand, the polarity of the next synchronization information is temporarily set based on the DSV (i.e. such that the DSV is minimized) (S604). After the polarity of the next synchronization information has been temporarily set, the DSV obtained if the synchronization information is recorded with the polarity which has been temporarily set is computed, and it is then determined whether or not the computed value exceeds a limit value (S605). If the computed value does not exceed the limit value at step S605, which means that suppression of the DSV is assured even if the synchronization information is recorded with a mark which is the temporarily set polarity, the next synchronization information is actually recorded with the polarity which has been temporarily set (S606). If the computed value exceeds the limit value at step S605, on the other hand, the next synchronization information is recorded with a polarity which is different from the polarity temporarily set, i.e. with a space (S607). If the polarity of the next synchronization information is temporarily set based on the DSV at step S604, the synchronization information can be recorded without undergoing the process at step S605.

According to the above example, while the polarities of the synchronization information are originally assumed to be in a manner of a mark as determined by DSV, a polarity as determined by DSV, a polarity of a space as determined by DSV, a mark, and so on, the synchronization information will be recorded with a polarity of mark as determined by DSV, a polarity as determined by DSV, a polarity of a space as determined by DSV, a space, if it is determined that the DSV exceeds the limit value with the polarity of the fourth synchronization information. Consequently, it is possible to perform ROPC with the mark appearing at a fixed frequency and also to assure suppression of DSV more reliably.

Figure 9:
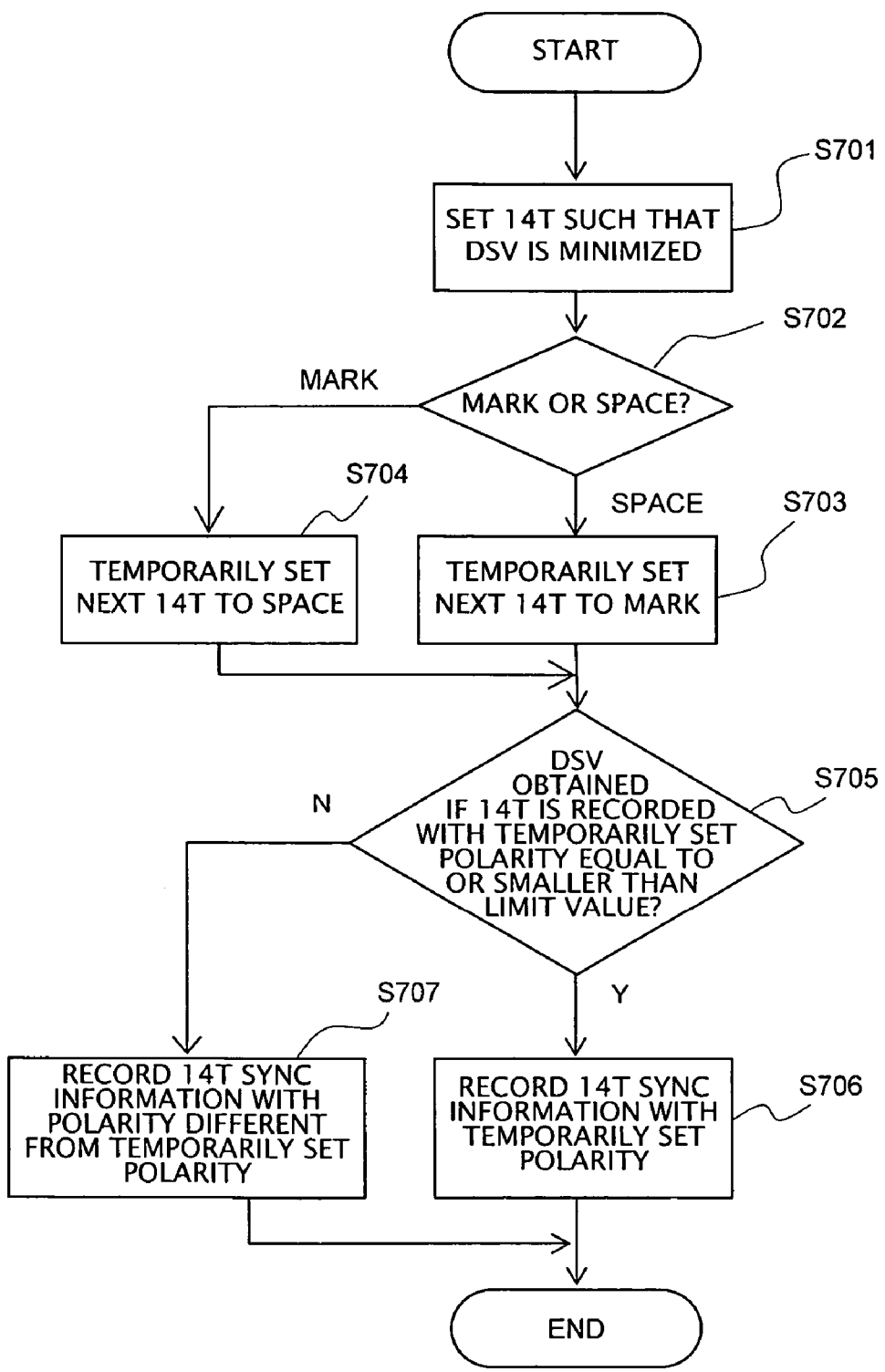
FIG. 9 another process flowchart of the embodiment.

FIG. 9 shows a modified example of the process flowchart shown in FIG. 8. In this processing, it is presupposed that when the polarity of the first synchronization information is set to a mark as determined by the DSV, the polarity of the next synchronization information is uniformly set to a space, not set such that the DSV is minimized. Specifically, the polarities of the synchronization information will be in a manner of a mark as determined by DSV, a space, a space as determined by DSV, a mark . . . With this processing, it is similarly possible to perform ROPC at the timing of marks which appear once in two times and also to suppress the DSV. According to the present embodiment, with this process, the polarity of the next synchronization information is set temporarily, not definitely, and the polarity which has been temporarily set is adopted only when the DSV falls within an allowable range.

First, as in step S601, the polarity of the first synchronization information is set such that the DSV is minimized, and the synchronization information is recorded with the polarity which has been set (S701). It is then determined to which of a mark or a space the polarity of the first synchronization information has been set (S702). If the polarity which has been set is a space, the polarity of the next synchronization information is temporarily set to a mark (S703). If the polarity which has been set is a mark, on the other hand, the polarity of the next synchronization information is temporarily set to a space (S704). Then, the DSV obtained if the synchronization information is recorded with the polarity which has been temporarily is computed, and it is determined whether or not the computed value is equal to or smaller than a limit value (S705). If the computed value is equal to or smaller than the limit value at step S705, the polarity which has been temporarily set is adopted, and the next synchronization information is recorded with the polarity which has been temporarily set (S706). If the computed value exceeds the limit value at step S705, on the other hand, the next synchronization information is recorded with a polarity which is different from the polarity which has been temporarily set (S707).

According to the present embodiment, while the polarities of the synchronization information are originally assumed to be in a manner of a mark as determined by DSV, a space, a space as determined by DSV, a mark, and so on, the synchronization information will be recorded in a manner of a mark as determined by DSV, a space, a space as determined by DSV, a space, if it is determined that the DSV exceeds the limit value when the polarity of the fourth synchronization information is a mark.

As described above, the SYNC selection section 18g of the encoder 18 of the present embodiment temporarily sets the polarity of the synchronization information in accordance with a presupposed rule. The polarities are temporarily set not in a random manner, but in accordance with a predetermined rule such that marks are allowed to appear at a fixed frequency so as to perform ROPC and spaces are allowed to appear as frequently as possible in frames in which LPPs are formed in order to suppress the influence of the marks on the LPPs. It is then confirmed whether or not the DSV obtained with regard to the polarity which has been temporarily set is equal to or smaller than a limit value, and the polarity which has been temporarily set is adopted only if the DSV is equal to or smaller than the limit value and the synchronization information is actually recorded with the adopted polarity. If the DSV exceeds the limit value, the polarity which has been temporarily set is not adopted, and the synchronization information is recorded with the opposite polarity. While recording of the synchronization information with the opposite polarity will not necessarily assure the DSV which is equal to or smaller than the limit value, it is possible to expect that the DSV is reduced.

Figure 10:
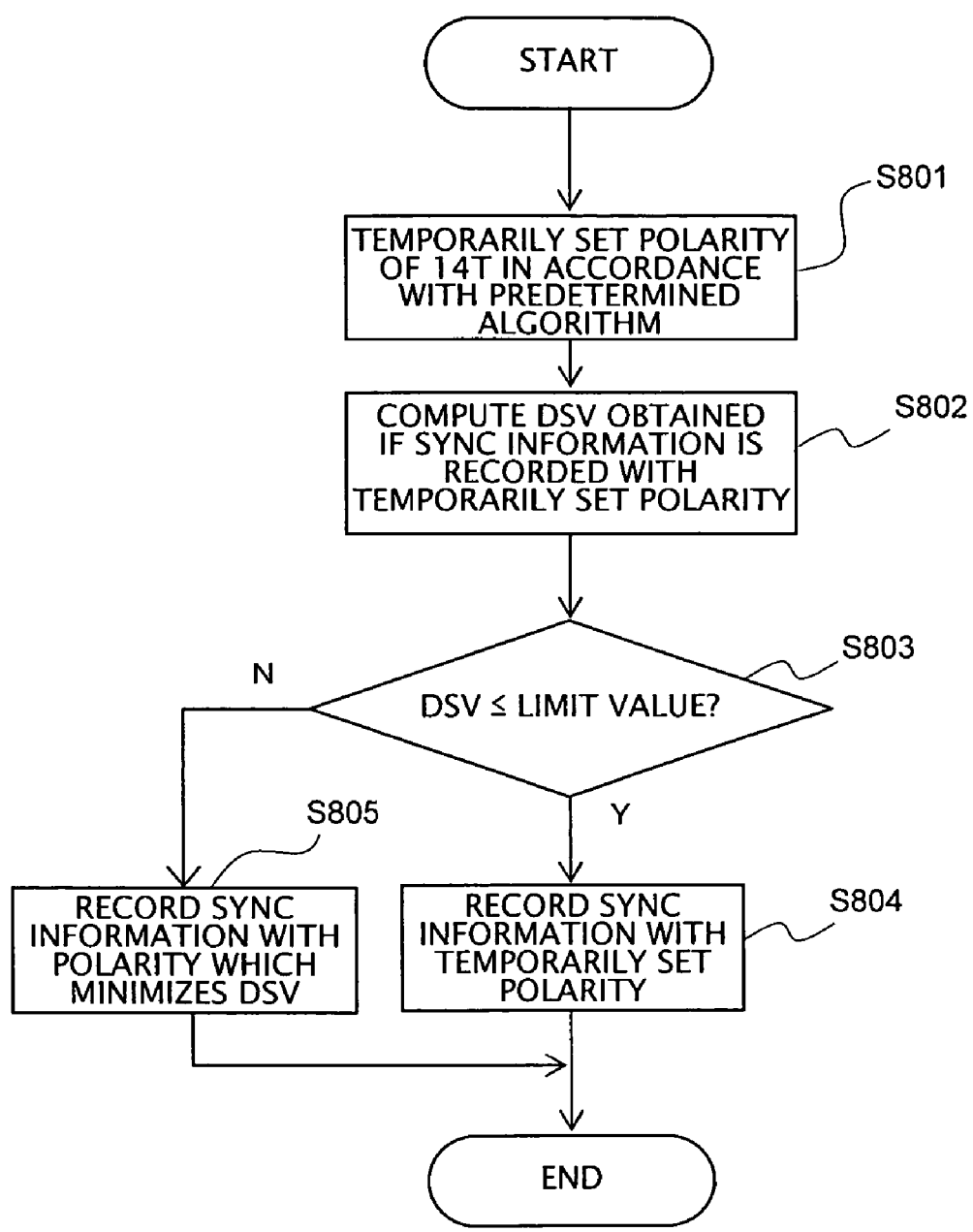
FIG. 10 is a flowchart of a basic process according to the embodiment.

FIG. 10 shows a conceptual basic flowchart according to the present embodiment. At the time of recording (inserting) the synchronization information, the polarity of the synchronization information is temporarily set in accordance with a predetermined algorithm (S801). Consequently, the polarity of that synchronization information is temporarily set to either a mark or a space. Then, the DSV obtained if the synchronization information which has been temporarily set is recorded is computed (S802). The DSV which is computed is compared with a limit value (S803). If the computed DSV is equal to or smaller than the limit value, the synchronization information is actually recorded with the polarity which has been temporarily set in accordance with the predetermined algorithm (S804). In this case, the desired object of the algorithm is achieved. If the DSV exceeds the limit value, on the other hand, the polarity which has been temporarily set is not adopted, and the synchronization information is actually recorded with the polarity with which the DSV is minimized. Here, the polarity which minimizes the DSV corresponds, in the end, to a polarity which is opposite to the polarity which has been temporarily set. Consequently, while the desired object of the algorithm is impeded to some extent, reliable suppression of the DSV can be achieved, which further results in higher quality of data recording and reproduction.

While preferred embodiments of the present invention have been described, the present invention is not limited to each of the above-described embodiments, and various changes may be made within the range of technical concept shown in the basic flowchart shown in FIG. 10.

For example, the following processing can be used as a predetermined algorithm. Specifically, as in the processing shown in FIG. 7, the polarity of the first synchronization information is set based on the DSV, and if the polarity of the first synchronization information is set to a space, the polarity of the next synchronization is set to a mark, whereas if the polarity of the first synchronization information is set to a mark, the polarity of the next synchronization is set based on the DSV. With regard to the following synchronization information, the polarity of the first one of two successive synchronization information items is set based on the DSV, and the polarity of the remaining one of the two successive synchronization information items is always set to a mark. In this case, it is possible that the polarity of the remaining one of two successive synchronization items is temporarily set to a mark and that the synchronization information is actually recorded with a mark as temporarily set only if the resulting DSV is equal to or smaller than a limit value whereas the synchronization information is actually recorded with a space if the resulting DSV exceeds the limit value.

Further, a predetermined algorithm in which, among a plurality of successive synchronization information items, the polarities of the i-th (wherein i is an integer which is 0 or greater) and (i+1)th synchronization information items are set to a mark or a space such that the respective DSVs are minimized, the polarity of the (i+2)th synchronization information item is set to a polarity which is opposite to that of the i-th synchronization information item, and the polarity of the (i+3)th synchronization information item is set to a polarity which is opposite to that of the (i+1)th synchronization information item, may be employed. According to this algorithm, as the polarities of the i-th synchronization information and the (i+2)th synchronization information are always opposite to each other, the polarity of either the i-th synchronization information or the (i+2)th synchronization information is a space. Consequently, assuming that the i-th synchronization information is to be recorded in an even frame, for example, the influence of marks onto LPP can be suppressed even if LPP is formed in an even frame. Similarly, as the polarities of the (i+1)th synchronization information and the (i+3)th synchronization information are always opposite to each other. Consequently, the influence of marks on LPP can be similarly suppressed even if the LPP is formed in an odd frame, because the polarity of either the (i+1)th synchronization information or the (i+3)th synchronization information is a space. In addition, with regard to two successive frames, whether they are an odd frame an even frame or an even frame and an odd frame, the synchronization information of one of these frames is a mark, so that ROPC can be performed at the timing of the mark. Also, as the polarities of the i-th and (i+1)th synchronization information items are set to a mark or a space such that the respective DSVs are minimized, DC components can be suppressed.

Then, using the above algorithm as a base processing, the polarities of the (i+2)th and (i+3)th synchronization information items are temporarily set. The DSV obtained if the synchronization information is recorded with the polarity which has been temporarily set is computed, and it is then determined whether or not the computed DSV is equal to or smaller than a limit value. If the DSV is equal to or smaller than the limit value, the (i+2)th and (i+3)th synchronization information items are then recorded with the polarities which have been temporarily set. Namely, the (i+2)th and (i+3)th synchronization information items are recorded with the polarities which are opposite to those of the i-th and (i+1)th synchronization information items, respectively. If the computed DSV exceeds the limit value, on the other hand, the polarity which has been temporarily set is not adopted, and the synchronization information is recorded with the polarity which minimizes the DSV (which is generally a polarity opposite to the polarity which has been temporarily set). In this case, while the polarities are originally assumed to be in a manner of a mark as determined by the DSV, a space as determined by the DSV, a space, a mark, and so on, the polarities will be in a manner of a mark as determined by the DSV, a space as determined by the DSV, a mark, a mark, and so on, because the DSV exceeds the limit value when the polarity of the third synchronization information item is set to a space which is opposite to the polarity of the first synchronization information item.

Further, a predetermined algorithm in which, among a plurality of successive synchronization information items, the polarity of the i-th (wherein i is an integer number which is 0 or greater) synchronization information is set to a mark or a space such that the DSV is minimized, the polarities of the (i+1)th and the (i+2)th synchronization information items are set to a polarity which is opposite to that of the i-th synchronization information, and the polarity of the (i+3)th synchronization information item is set to the same polarity as that of the i-th synchronization information, may be employed. As in the foregoing algorithm, according to this algorithm, as the polarities of the i-th synchronization information and the (i+2)th synchronization information are always opposite to each other, the polarity of either the i-th synchronization information or the (i+2)th synchronization information is a space. Consequently, assuming that the i-th synchronization information is to be recorded in an even frame, for example, the influence of marks on LPP can be suppressed even if LPP is formed in an even frame. Similarly, as the polarities of the (i+1)th synchronization information and the (i+3)th synchronization information are always opposite to each other, the influence of marks on LPP can be similarly suppressed even if the LPP is formed in an odd frame, because the polarity of either the (i+1)th synchronization information or the (i+3)th synchronization information is a space. In addition, with regard to two successive frames, whether they are an odd frame and an even frame or an even frame and an odd frame, the synchronization information of one of these frames is a mark, so that ROPC can be performed at the timing of the mark.

Then, using the above algorithm as a base processing, the polarities of the (i+1)th and (i+2)th synchronization information items are temporarily set to a polarity which is opposite to that of the i-th synchronization information, and the polarity of the (i+3)th synchronization information item is temporarily set to the same polarity as that of the i-th synchronization information. The DSV obtained if each of the synchronization information items is recorded with the polarity which has been temporarily set is computed, and it is then determined whether or not the computed DSV is equal to or smaller than a limit value. If the DSV is equal to or smaller than the limit value, the synchronization information is then recorded using the polarity which has been temporarily set. If the computed DSV exceeds the limit value, on the other hand, the polarity which has been temporarily set is not adopted, and the polarity which minimizes the DSV or the polarity which is opposite to the polarity which has been temporarily set is adopted.

Further, a predetermined algorithm in which, among a plurality of successive synchronization information items, the polarity of the i-th (wherein i is an integer number which is 0 or greater) synchronization information is set to a mark or a space such that the DSV is minimized, the polarity of the (i+1)th synchronization information is set to the same polarity as that of the i-th synchronization information, and the polarities of the (i+2)th and the (i+3)th synchronization information items are set to a polarity which is opposite to that of the i-th synchronization information, may be employed. In this case, as in the foregoing algorithm, the polarities of the i-th to the (i+3)th synchronization information items are temporarily set, and the synchronization information is recorded with the polarity which has been temporarily set only if the resulting DSV is equal to or smaller than a limit value.

Also, a predetermined algorithm in which the polarity of at least one of a plurality of synchronization information items is set to a space can be adopted. In this case, the polarity of the synchronization information at a data portion which is to be a space is temporarily set to a space, and the synchronization information is recorded using the space as temporarily set only if the resulting DSV is equal to or smaller than a limit value even with the polarity being set to a space.

It should be noted that a person with ordinary skill in the art will be able to conceive of other algorithms. While in optical disks in which LPP is formed, such as DVD-R and DVD-RW, it is desired that the polarity of synchronization information recorded at a position which is synchronized with the LPP is a space as described above, with regard to disks in which LPP is not formed, no such matters need not be considered and the polarity of the synchronization information can be temporarily set in accordance with ROPC and DSV. With regard to rewritable optical disks, as the number of times data on the optical disk can be rewritten may be decreased if the polarity of synchronization information at the same data portion is always set to a mark, it is preferable to temporarily set the polarity so as to include a space.

In the above embodiments, because the polarity which has been temporarily set in accordance with a predetermined algorithm is adopted if the resulting DSV is equal to or smaller than a limit value, the limit value functions as a criterion for determining the degree of priority to be given to the predetermined algorithm (i.e. the degree of priority to be given to the DSV). It is therefore preferable to change the limit value depending on an optical disk or in accordance with the object of the data recording. For example, when it is desired to further suppress the DC components, the limit value is set smaller than 1023, whereas if a greater importance is placed to ROPC than to the reduced DC components, the limit value is set greater than 1023, for example. The limit value may be prestored in an internal memory in the SYNC selection section 18g or may be supplied to the SYNC selection section 18g from the internal memory of the controller 20.

Further, while in the above examples, the present invention has been described using a DVD-R drive and a DVD-RW drive as examples, the present invention is also applicable to a DVD+R drive and a DVD+RW drive, for example, and also to a HD DVD. In HD DVD, synchronization information having a data length of 13 T, not 14 T, is inserted. Here, it should be noted that DVD+R/RW and HD DVD are optical disks in which LPP is not formed.

While the preferred embodiments of the present invention have been described using specific terms, such description is for illustrative purposes only, and it is to be understood that changes and variations may be made without departing from the spirit or scope of the appended claims.

What is claimed is:

1. An optical disk apparatus which records data on an optical disk by inserting synchronization information in every predetermined information unit, comprising:
    temporarily setting means for temporarily setting a polarity of a next synchronization information item to either a mark or a space in accordance with a predetermined rule;
    computation means for computing a DSV to be obtained by inserting the next synchronization item with the polarity which has been temporarily set;
    determination means for determining whether or not the DSV which is computed is equal to or smaller than a predetermined limit value; and
    synchronization information controlling means which accepts the polarity which is temporarily set and inserts the next synchronization information item with the polarity when, as a result of the determination by the determination means, it is determined that the DSV is equal to or smaller than the predetermined limit value and which does not accept the polarity which has been temporarily set and inserts the next synchronization information with a polarity with which the DSV is minimized when, as a result of the determination by the determination means, it is determined that the DSV exceeds the predetermined limit value.

2. An optical disk apparatus which records data on an optical disk by inserting synchronization information in every predetermined information unit, comprising:
    temporarily setting means for temporarily setting a polarity of a next synchronization information item to either a mark or a space in accordance with a predetermined rule;
    computation means for computing a DSV to be obtained by inserting the next synchronization item with the polarity which has been temporarily set;
    determination means for determining whether or not the DSV which is computed is equal to or smaller than a predetermined limit value; and
    synchronization information controlling means which accepts the polarity which has been temporarily set and inserts the next synchronization information item with the polarity when, as a result of the determination by the determination means, it is determined that the DSV is equal to or smaller than the predetermined limit value and which does not accept the polarity which has been temporarily set and inserts the next synchronization information with a polarity which is different from the polarity which has been temporarily set when, as a result of the determination by the determination means, it is determined that the DSV exceeds the predetermined limit value.

3. An optical disk apparatus according to claim 1, wherein the predetermined rule is a rule in which a mark appears at a predetermined frequency.

4. An optical disk apparatus according to claim 1, wherein a land pre-pit is formed in the optical disk, and
the predetermined rule is a rule in which the polarity of the synchronization information to be inserted at a position which is in synchronization with the land pre-pit comes to a space at a predetermined frequency.

5. An optical disk apparatus according to claim 1, wherein the predetermined rule is a rule in which a mark and a space appear alternately.

6. An optical disk apparatus according to claim 1, wherein the predetermined rule is a rule in which the polarity is set to a mark in an odd frame and the polarity is set such that the DSV is minimized in an even frame.

7. An optical disk apparatus according to claim 1, wherein the predetermined rule is a rule in which the polarity of a first synchronization information item is set such that the DSV is minimized and the polarity of a next synchronization information item is set in accordance with the polarity of the first synchronization information item.

8. An optical disk apparatus according to claim 1, wherein the predetermined rule is a rule in which the polarity of a first synchronization information item is set such that the DSV is minimized and the polarity of a next synchronization information item is set to a space if the polarity of the first synchronization information item is a mark.

9. An optical disk apparatus according to claim 2, wherein the predetermined rule is a rule in which a mark appears at a predetermined frequency.

10. An optical disk apparatus according to claim 2, wherein
a land pre-pit is formed in the optical disk, and
the predetermined rule is a rule in which the polarity of the synchronization information to be inserted at a position which is in synchronization with the land pre-pit comes to a space at a predetermined frequency.

11. An optical disk apparatus according to claim 2, wherein
the predetermined rule is a rule in which a mark and a space appear alternately.

12. An optical disk apparatus according to claim 2, wherein
the predetermined rule is a rule in which the polarity is set to a mark in an odd frame and the polarity is set such that the DSV is minimized in an even frame.

13. An optical disk apparatus according to claim 2, wherein
the predetermined rule is a rule in which the polarity of a first synchronization information item is set such that the DSV is minimized and the polarity of a next synchronization information item is set in accordance with the polarity of the first synchronization information item.

14. An optical disk apparatus according to claim 2, wherein
the predetermined rule is a rule in which the polarity of a first synchronization information item is set such that the DSV is minimized and the polarity of a next synchronization information item is set to a space if the polarity of the first synchronization information item is a mark.

15. An optical disk apparatus comprising:
an optical pickup; and
an encoder which supplies data to be recorded to the optical pickup,
wherein the encoder includes:
a modulator for modulating the data to be recorded;
a calculator for computing a DSV of data which is modulated by the modulator;
a synchronization information generator for generating synchronization information having a polarity of a mark and synchronization information having a polarity of a space;
a selector for selecting between the synchronization information having a polarity of a mark and the synchronization information having a polarity of a space supplied from the synchronization information generator and outputting the synchronization information which is selected; and
a selector controller for controlling selection by the selector according to a rule in which the polarity of a mark is allowed to appear at a predetermined frequency and controlling such that, if the DSV which is computed by the calculator in accordance with the rule exceeds a predetermined limit value, the DSV is suppressed independently of the rule.

* * * * *

UNITED STATES PATENT AND TRADEMARK OFFICE
CERTIFICATE OF CORRECTION

PATENT NO. : 7,154,417 B2
APPLICATION NO. : 11/273707
DATED : December 26, 2006
INVENTOR(S) : A. Mashimo It is certified that error appears in the above-identified patent and that said Letters Patent is hereby corrected as shown below:

| Title | Page | |
|---|---|---|
| Item (73) | Assignee | "Teac Corporation," should read --TEAC Corporation,-- |
| Col. 18 | LN. 17 | double indent the phrase "a modulator...;" |
| Col. 18 | LN. 28 | double indent the phrase "a calculator...;" |
| Col. 18 | LN. 30 | double indent the phrase "a synchronization...;" |
| Col. 18 | LN. 34 | double indent the phrase "a selector...;" |
| Col. 18 | LN. 40 | double indent the phrase "a selector controller...." |

Signed and Sealed this

Twenty-fourth Day of April, 2007

JON W. DUDAS
*Director of the United States Patent and Trademark Office*